US010819438B1

(12) United States Patent
Stahl et al.

(10) Patent No.: US 10,819,438 B1
(45) Date of Patent: Oct. 27, 2020

(54) OPTICAL GROOMING INTERCONNECTION NETWORK

(71) Applicant: Acacia Communications, Inc., Maynard, MA (US)

(72) Inventors: Jon Stahl, Wayland, MA (US); James Duda, Waltham, MA (US)

(73) Assignee: Acacia Communications, Inc., Maynard, MA (US)

(*) Notice: Subject to any disclaimer, the term of this patent is extended or adjusted under 35 U.S.C. 154(b) by 0 days.

(21) Appl. No.: 16/364,909

(22) Filed: Mar. 26, 2019

Related U.S. Application Data (60) Provisional application No. 62/782,490, filed on Dec. 20, 2018.

(51) Int. Cl.
*H04B 10/40* (2013.01)
*H04J 14/02* (2006.01)
*H04Q 11/00* (2006.01)

(52) U.S. Cl.
CPC .......... *H04B 10/40* (2013.01); *H04J 14/0269* (2013.01); *H04Q 11/0005* (2013.01); *H04Q 2011/0058* (2013.01); *H04Q 2011/0073* (2013.01)

(58) Field of Classification Search
CPC ................. H04Q 2011/0058; H04B 10/40
See application file for complete search history.

(56) References Cited

U.S. PATENT DOCUMENTS

| 8,964,733 | B1* | 2/2015 | Aybay | H04L 49/357 370/386 |
| 2012/0014253 | A1* | 1/2012 | Rongong | H04L 49/35 370/235 |
| 2014/0241718 | A1* | 8/2014 | Jiang | H04B 10/40 398/48 |
| 2015/0106932 | A1* | 4/2015 | Mesec | H04L 63/1425 726/23 |
| 2015/0229404 | A1* | 8/2015 | Boertjes | H04B 10/516 398/183 |
| 2016/0234580 | A1* | 8/2016 | Clarke | H04Q 11/0066 |
| 2016/0323037 | A1* | 11/2016 | Leigh | H04Q 11/0005 |
| 2017/0310392 | A1* | 10/2017 | Boertjes | H04B 10/07953 |

* cited by examiner

*Primary Examiner* — Casey L Kretzer
(74) *Attorney, Agent, or Firm* — Joseph D'Angelo (57) ABSTRACT

A system, apparatus, and method for an optical grooming network; wherein a set of switches form an optical grooming interconnection system where each switch is communicatively coupled to each other switch; a set of clients; where each switch of the set of switches is communicatively coupled to a client of the clients; wherein each client receiver is enabled to communicate through the set of switches to any client or modem; and a set of coherent optical modems; wherein each coherent optical modem is communicatively coupled to a switch of the set of switches; wherein each client of the clients is able to communicate through the set of switches to every coherent optical modem of the set of coherent optical modems, and each coherent optical modem in the set of coherent optical modems can communicate to every coherent optical modem of the set of coherent optical modems.

15 Claims, 8 Drawing Sheets

OPTICAL GROOMING INTERCONNECTION NETWORK

RELATED APPLICATION

This application claims the benefit of U.S. provisional patent application 62/782,490 filed Dec. 20, 2018, titled "Optical Grooming Interconnection Network," which is incorporated herein by reference in its entirety for all purposes.

BACKGROUND

Electrical information may be converted to optical information and transmitted over a fiber optic cable.

SUMMARY

A system, apparatus, and method for an optical grooming network; wherein a set of switches form an optical grooming interconnection system such that each switch is communicatively coupled to each other switch in the set of switches; a set of clients; where each switch of the set of switches is communicatively coupled to a client of the set of clients; wherein each client receiver is enabled to communicate through the set of switches to any client transmitter or modem transmitter; and a set of coherent optical modems; wherein each coherent optical modem is communicatively coupled to a switch of the set of switches; wherein each client of the set of clients is able to communicate through the set of switches to every coherent optical modem of the set of coherent optical modems, and each coherent optical modem in the set of coherent optical modems can communicate to every coherent optical modem of the set of coherent optical modems.

BRIEF DESCRIPTION OF THE FIGURES

Various aspects and embodiments of the application will be described with reference to the following example embodiments. It should be appreciated that the figures are not necessarily drawn to scale.

DETAILED DESCRIPTION

Generally, an optical communication system may have connected optical transceivers. Often in an optical communication system, there may be a number of information sources or clients. Typically information in electronic form from one or more clients may be combined, converted into an optical format, and transmitted over an optical link from a transmitter or transceiver to a receiver or transceiver, where the information is converted to an electrical format, divided by client, and sent to a receiver client. Generally, client data may be routed through a number of modems on a transmit side to modems on a receive side, before being delivered to receive clients. Usually, however, a single modem may have been used in optical communication on a transmit side to a single modem on a receiver side.

Typically, transmit clients may have a set data rate of data to be transmitted in an optical system. Usually, the clients are connected to a switch, through client interfaces, to a set of modems that communicate the data over a link to a receiver system. Usually, the modems have a transmission capacity greater than the client. Often, data from multiple clients may be combined or multiplexed (muxed) to be sent across on a modem. Typically, in optical systems, a partial crossbar switch has been used to connect the clients to the modems. Usually, a partial crossbar provides connectivity between clients and modems. Any client transmitter can drive any transmitter modem. Typically with a crossbar switch, any receive modem can provide data to any client receiver through a direct connection. Usually, however, any client may only transmit its data to modems and not to another client with a crossbar switch.

In most embodiments, the current disclosure has realized that there are limitations with the use of a crossbar switch. In many embodiments, the current disclosure has realized there are increased overhead, power, and material associated with the use of a crossbar switch. In most embodiments, a crossbar switch may be undesirable as it may require each client to have a direct connection with each modem. In certain embodiments, as the number of clients grows and modems grows, routing and connections between each client and connection grows exponentially. In most embodiments, a crossbar switch may not provide client to client communication, rather connects clients directly to modems.

In almost all embodiments, the current disclosure has realized that it may be beneficial to use a different type of interconnect to route traffic from clients to modems. In many embodiments the current disclosure has realized that an optical grooming interconnection system may offer advantages over a typical cross bar switch. In most embodiments, an optical grooming interconnection system may be able to route data from a client to a modem eliminating a need for each client to be directly connected to each modem. In many embodiments, the use of an optical grooming interconnection system may enable many different modems to be connected on a transmit and receive side of an optical connection.

In most embodiments, each client may be connected to an optical grooming interconnection system and the optical grooming interconnection system may be connected to each modem. In some embodiments, an optical grooming interconnection system may include a number of switches connected to each other, with at least one switch directly connected to a client. In most embodiments, a switch may be a device that communicatively couples inputs to the switch to one or more outputs of a switch. In certain embodiments, a switch may be able to route information to a particular location. In some embodiments, information sent into a switch may have routing or destination meta information in the information. In almost all embodiments, a switch may have multiple input and output connections.

In many embodiments, a particular switch may be connected to a modem, with each modem connected to a single switch but each switch may not be connected to a modem. In many embodiments, an optical grooming interconnection system may enable each modem to be able to communicate with each other modem. In certain embodiments, each client may be able to communicate with each other client through an optical grooming interconnection system. In certain embodiments, a switch may be used to route the output of a client to different modems for transmission.

In most embodiments, each transmit modem may have a multiplexor and each receive modem may have a demultiplexor. In many embodiments, a modem may be a coherent modem. In most embodiments, a coherent modem may be a modem that supports producing data in coherent modulation formats such as BPSK, QPSK, 8 QAM, 16 QAM, 32, QAM, 64 QAM, 128 QAM, as well as other QAM formats. In many embodiments, a coherent modem may be a modem that supports decoding data in coherent modulation formats such as BPSK, QPSK, 8 QAM, 16 QAM, 32, QAM, 64 QAM, 128 QAM, as well as other QAM formats. In most embodiments, coherent transmit modem may be able to combine or multiplex multiple data streams from clients, wherein each client has a particular bit rate, together into a single data stream with a higher bit rate to be transmitted across an optical link.

In other embodiments, a coherent receive modem may be able to split or demux a data stream at a first bit rate into client data streams, where each client has a data stream particular bit rate. In some embodiments a coherent modem may be a coherent optical modem. In most embodiments, a coherent optical modem may be able to combine data streams, each data stream with a bit rates, from clients into a single data stream with a bit rate and output the data stream as an coherent optical signal in a coherent modulation format. In many embodiments, coherent modulation formats may include BPSK, QPSK, 8 QAM, 16 QAM, 32, QAM, 64 QAM, 128 QAM, as well as other QAM formats. In most embodiments, in a system or optical transceiver with multiple optical coherent modems, each modem may transmit a coherent signal at different wavelengths of light.

In certain embodiments, a coherent modem may be capable of a transmission data of 100 Gbps. In certain other embodiments, a coherent modem may be capable of a transmission data of 200 Gbps. In further embodiments, a coherent modem may be capable of a transmission data of 300 Gbps. In other embodiments, a coherent modem may be capable of a transmission data of 400 Gbps. In still further embodiments, a coherent modem may have a settable transmission data rate. In certain embodiments, a client may have a transmission data rate of 50 Gbps. In other embodiments, a client may have a transmission data rate of 100 Gbps. In further embodiments, a client may have a transmission data rate of 200 Gbps. In still further embodiments, a client may have a settable transmission data rate.

In almost all embodiments, Applicants have recognized the advantages of using multiple modems in an optical transport system, where conventional systems may use a transmit and receive modem on each side of a link. In further embodiments, Applicants realized the limitations of using a crossbar switch with multiple modems and the current disclosure provides solutions to the limitations of a crossbar switch.

In some embodiments, a routing table for an optical grooming network may be provisioned when an optical transport system is initialized. In certain embodiments, a host may statically configure an optical grooming network after initialization. In some embodiments, an optical grooming network may not be dynamically switched. In many embodiments, a routing table may map one or more clients to one or more modems through one or more switches. In some embodiments, a routing table may provide a mapping between each switch of a set of switches. In many embodiments, a routing table may map clients and switches to enable each client to communicate with each other client through switches.

In certain embodiments, an optical grooming network may enable splitting of client data across different modems. In some embodiments, splitting of client data across modems may require deskewing of data received at a receiver due to delay across modems. In many embodiments, deskewing may refer to removing delay or skew between data transmitted on different paths because of differences in transmission speed or delays therein of the data across different transmission paths.

In alternative embodiments, to adjust bandwidth or connections of an optical grooming network, the optical grooming network may be re-provisioned and a routing table may be updated or changed. In many embodiments, the current disclosure has realized that using two or more modems may add bandwidth density. In most embodiments, the current disclosure has realized that using an optical grooming network may limit area and power needed on a chip. In many embodiments, the use of an optical grooming network on a chip may avoid the need for external switching equipment. In most embodiments, the current disclosure has realized that as a number of clients and modems increase that a crossbar switch may not fit on a chip.

Figure 1:
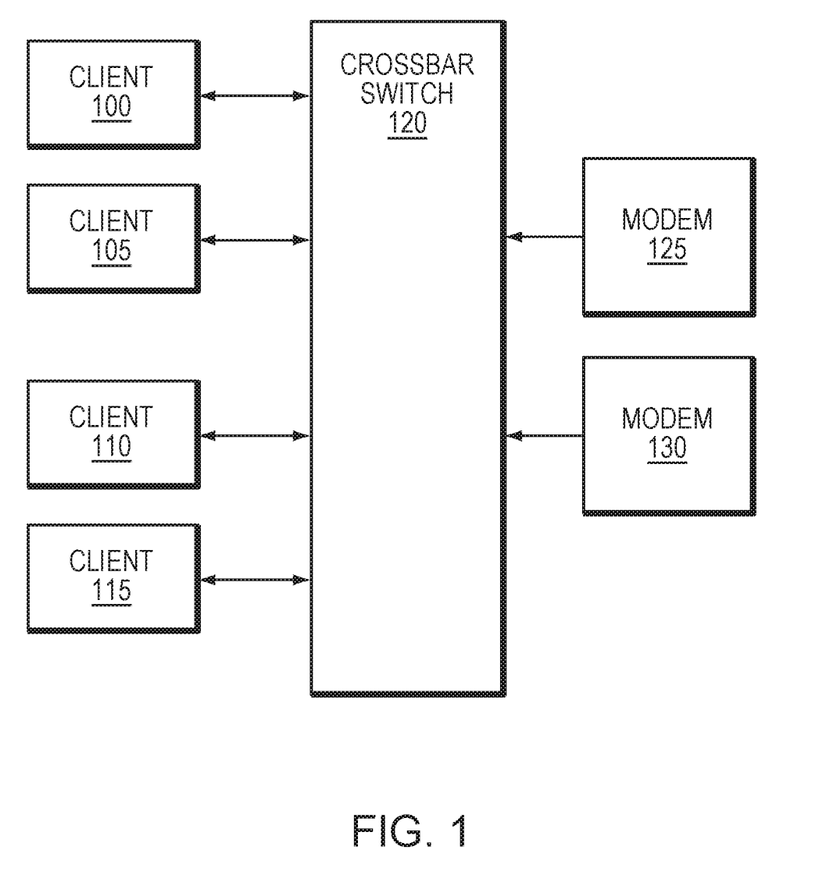
FIG. 1 is a simplified illustration of a crossbar switch, according to an embodiment of the current disclosure.

Refer now to the example embodiment of FIG. 1. In the example embodiment of FIG. 1, clients 100, 105, 110, and 115, are connected through crossbar switch 120 to modem 125 and modem 130. Modem 125 is a transmit modem and modem 130 is a receive modem. In the example embodiment of FIG. 1, crossbar switch 120 enables each client and to send information to modem 125 and receive information from modem 130.

Figure 2:
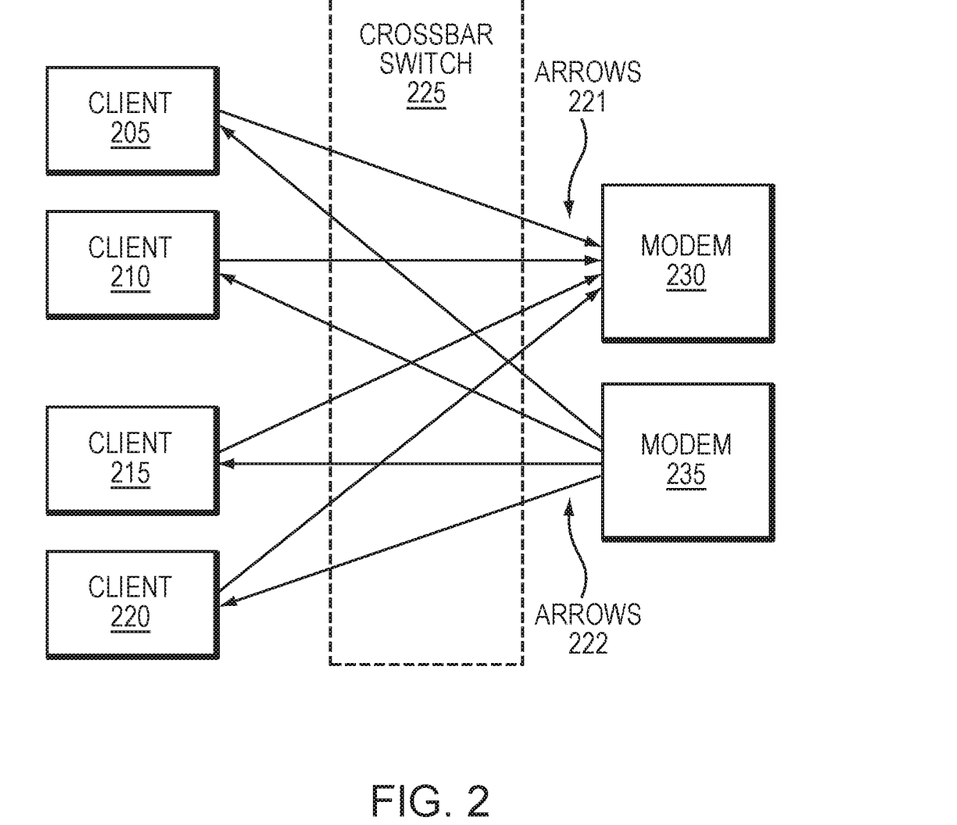
FIG. 2 is an alternative simplified illustration of a crossbar switch, according to an embodiment of the current disclosure.

Refer now to the example embodiment of FIG. 2, which illustrates an alternative embodiment of the communication system of FIG. 1. In the example embodiment of FIG. 2, crossbar switch 225 is represented by group of arrows 221 and group of arrows 222. Clients 205, 210, 215, 220 are connected to transmit modem 230 through connections designated by arrows 221. Clients 205, 210, 215, 220 are connected to receive modem 235 through connections designated by arrows 222. In this example embodiment, clients are not interconnected and do not have the ability to communicate with each other. In this example embodiment, for a client to be connected to a modem, there is a direct connection between the client and the modem.

Figure 3:
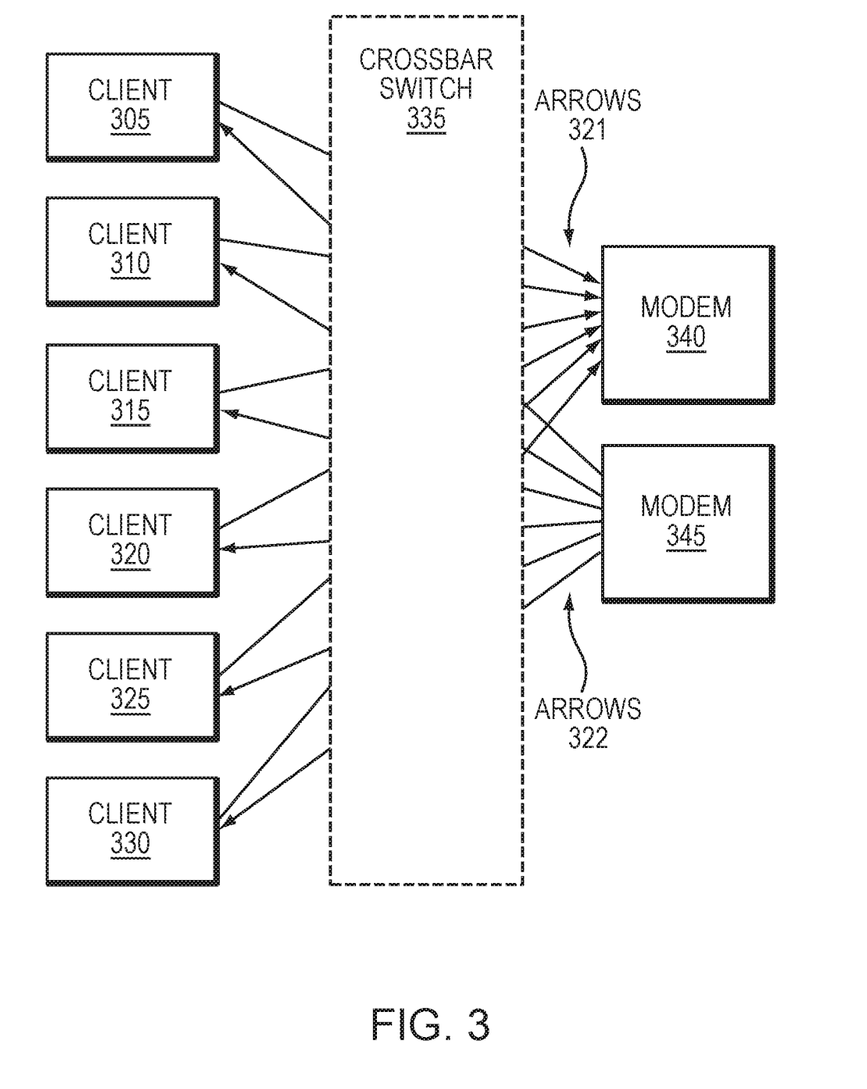
FIG. 3 is a further alternative simplified illustration of a crossbar switch, according to an embodiment of the current disclosure.

Refer now to the example embodiment of FIG. 3, which illustrates a crossbar switch with 6 clients. In this example embodiment, Clients 305, 310, 315, 320, 325, and 330 are connected to modem 340 through crossbar switch 335 by connections indicated by arrows 321. Clients 305, 310, 315, 320, 325, and 330 are connected to modem 345 through crossbar switch 335 by connections indicated by arrows 322. Compare the example embodiment of FIG. 3 with the example embodiment of FIG. 2, where the addition of two clients has resulted in 4 additional connections.

In almost all embodiments, with a crossbar switch, the addition of each additional client increases the number of connections, with two modems by two. In other embodiments, with a crossbar switch and 4 modems, each additional client would add 4 connections. In many embodiments, as additional clients and modems are added the number of required connections expands exponentially.

Figure 4:
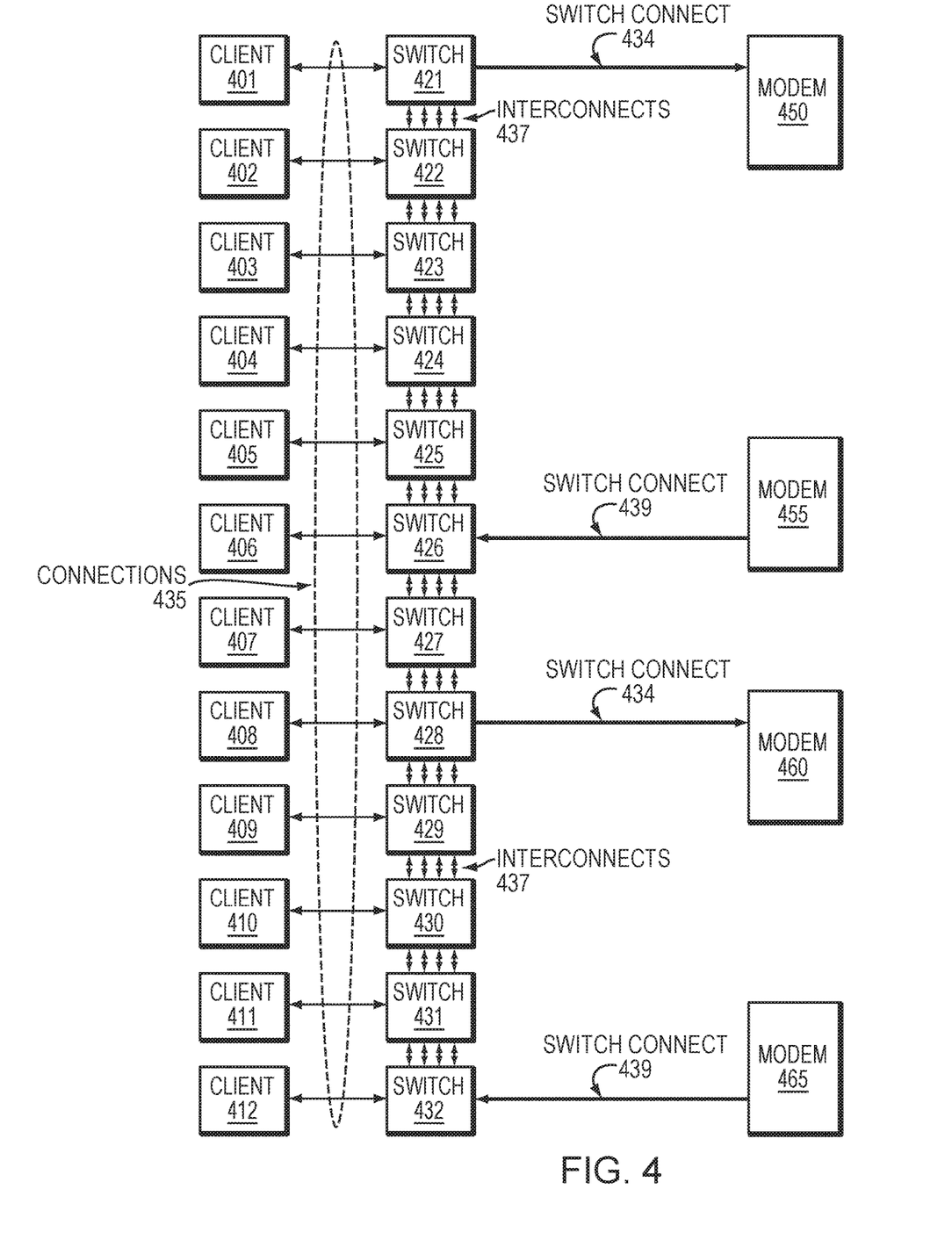
FIG. 4 is a simplified illustration of an optical grooming interconnection network, according to an embodiment of the current disclosure.

Refer now to the example embodiment of FIG. 4. In the example embodiment of FIG. 4, there are clients 401-412 and switches 421-432. Each client is connected to a switch through a single connection such as shown in connections 435. For example, client 401 is connected to switch 421 and client 405 is connected to switch 425. Each switch is connected to at least one other switch through interconnects such as interconnects 437. For example switch 421 is connected to switch 422 through interconnects and switch 422 is connected to switch 421 and switch 423 through interconnects. Through switches 421-432 data from one client sent to a particular switch may be transferred to the switches to any other switch. Switch 421 is connected to transmit modem 450 and switch 428 is connected to transmit modem 460 through switch connects 434. Receive modem 465 is connected to switch 432 and receive modem 455 is connected to switch 426 through switch connects 439. In this example embodiment, each client only needs one connection to each switch, where the switches make an optical grooming interconnection system, and each modem needs a single connection to a switch of the optical grooming interconnection system. In this embodiment, each additional client would include the addition of an additional switch connected to the optical grooming interconnection system. In this embodiment, addition of an additional modem would include the addition of a connection between a switch and the additional modem.

Figure 5:
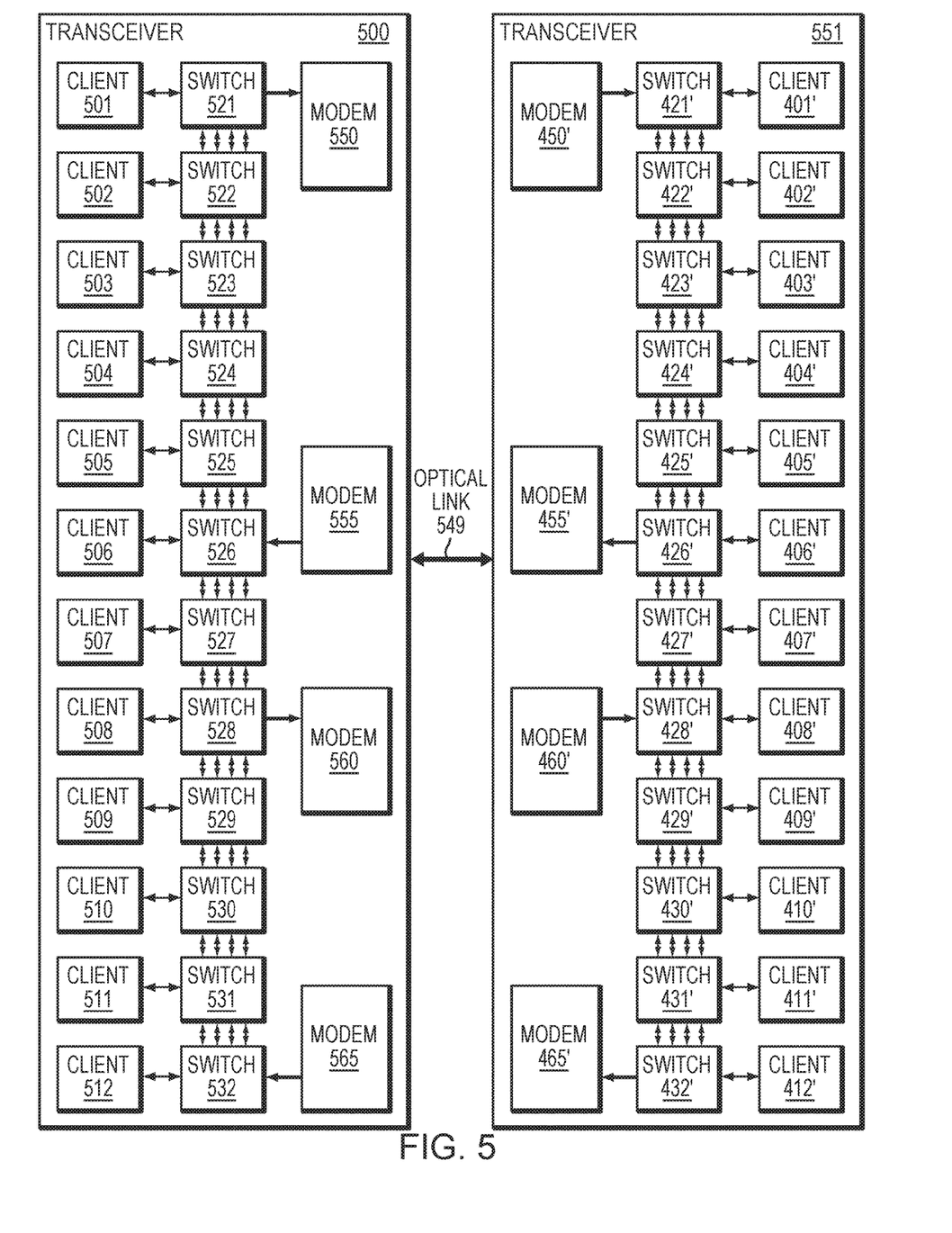
FIG. 5 is an alternative simplified illustration of an optical grooming interconnection network, according to an embodiment of the current disclosure.

Refer now to the example embodiment of FIG. 5, which represents a simplified optical system. Transceiver 500 is connected through optical link 549 to transceiver 551. Each transceiver has data from clients, such as clients 501-512 that is routed through switched, such as switches 521-532, to modems, such as modem 550 and 560. Data from outgoing modems is sent across optical link 549 to transceiver 551 and sent to receiving modems, such as modem 450' and 460'. Information from modems 450' and 460' are sent to switches 421' and 428', routed through switches 421'-432' to arrive at a respective client for the information, such as clients 401'-412'.

Figure 6A:
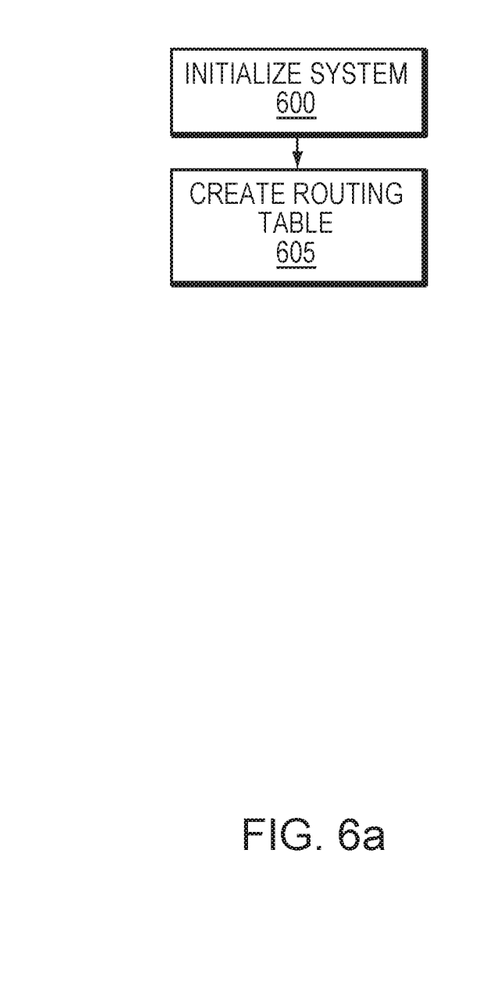
FIG. 6a is an example embodiment of a method for creating a routing table, according to an embodiment of the current disclosure.
Figure 6B:
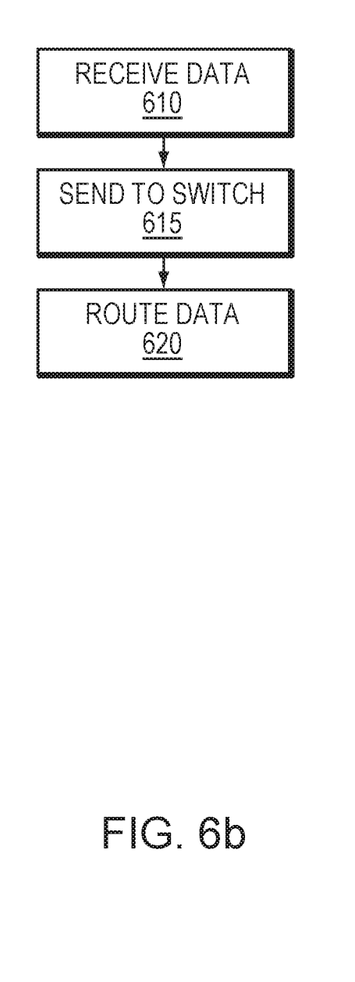
FIG. 6b is an example embodiment of a method for routing data, according to an embodiment of the current disclosure.
Figure 6C:
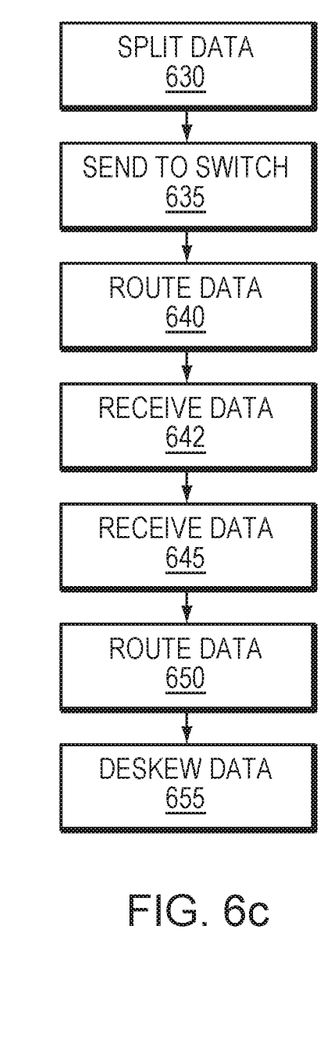
FIG. 6c is an example embodiment of a method for splitting and transmitting client data across two modems, according to an embodiment of the current disclosure.
Figure 7:
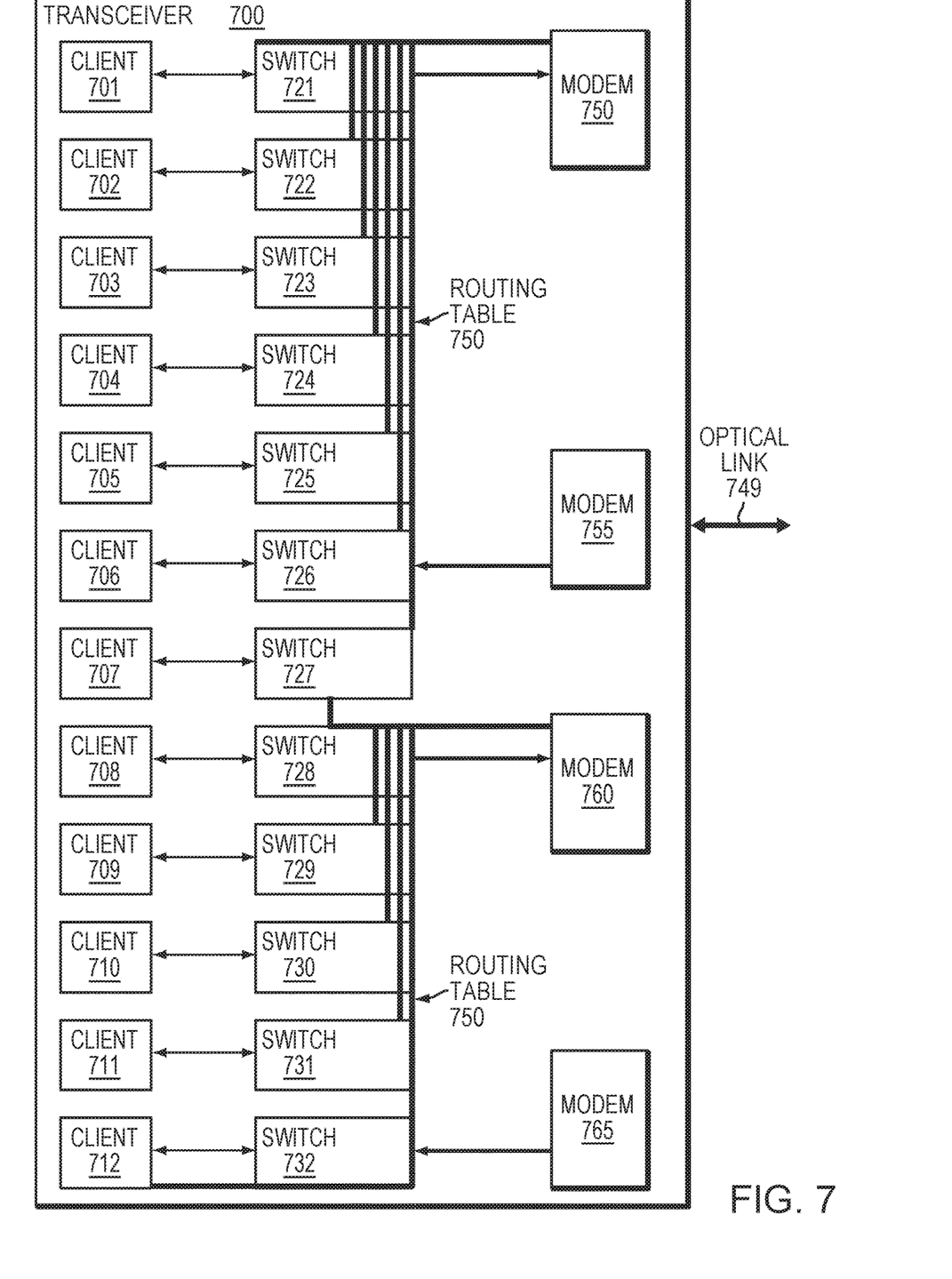
FIG. 7 is a simplified illustration of a routing table for part of an optical grooming interconnection network, according to an embodiment of the current disclosure.

Refer now to the example embodiments of FIGS. 5, 6, and 7. Transceiver 500 is initialized (step 600). Routing table is created (step 610), which is illustrated graphically as routing table 750 on switches 721-732 and modems 750 and 760 on transceiver 700. In this routing table each switch of switches 721-732, except switch 727, is routed to either modem 750 or modem 765. In this embodiment, for simplicity of illustration each switch is routed to a modem graphically close to it, but in other embodiments other arrangements of routing between switches and modems may be chosen. In the embodiment of FIG. 7, switch 727 routes client data from client 708 across modem 750 and 760.

Data is received at a client, such as client 701 (Step 610). Client, such as client 701 sends the data to a switch, such as switch 721 (step 615). The data is routed to a modem, such as modem 750 through the optical grooming network (step 620).

In certain embodiments, data of a client may be divided across two or more modems. Referring back to FIGS. 5, 6, and 7, data arrives at client 701. Data from client is split (step 630). Data is set to switch (step 635). Each portion of the split data is routed to a different modem, modems 750 and 760, respectively (640). Data is transmitted across an optical link to a transceiver (step 642). Data is received at the other transceiver (step 645). Each portion of the split data is received by two modems, modems, respectively is routed to client (step 650). Each portion of the split data is deskewed (step 655) and combined at client.

Figure 8:
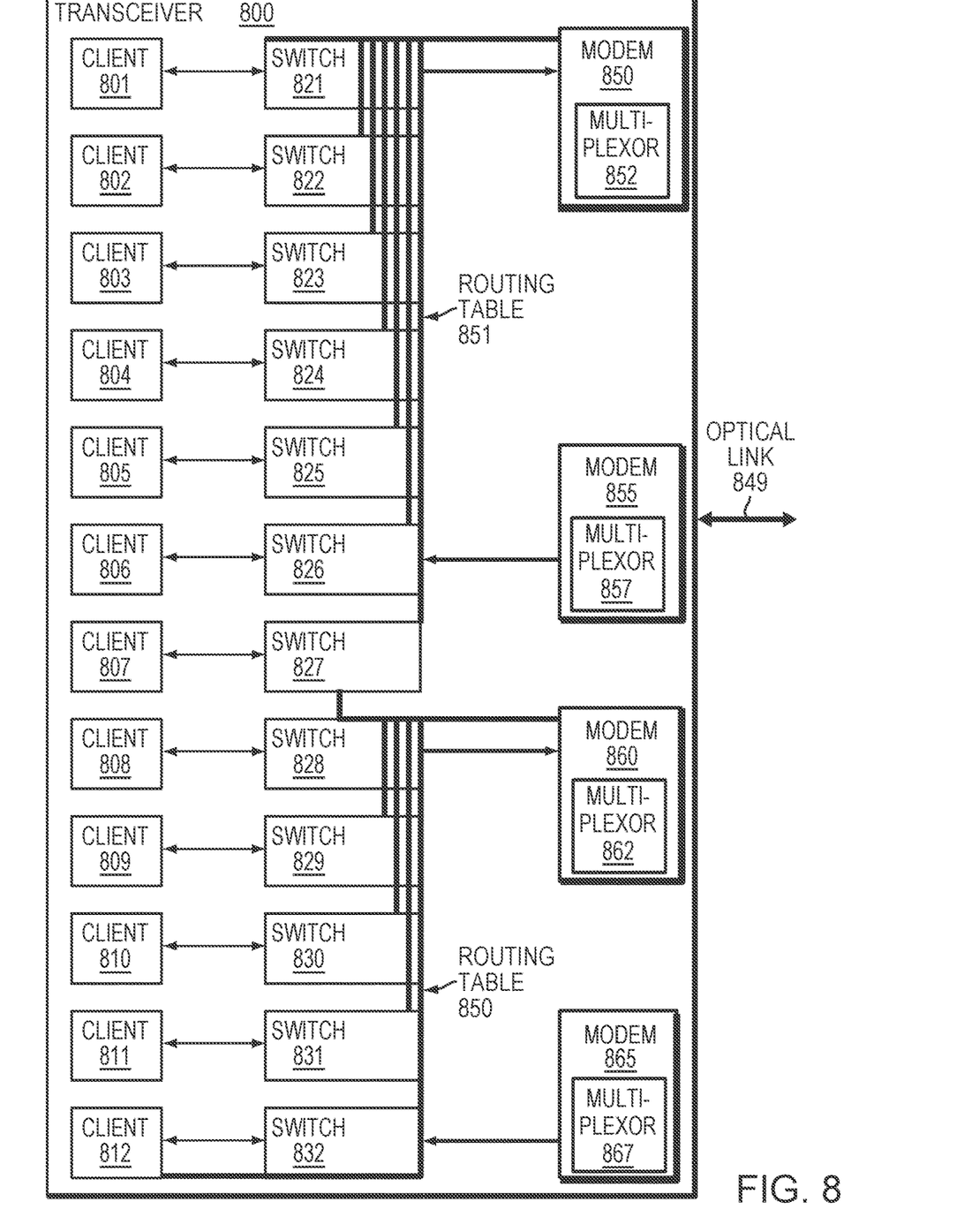
FIG. 8 is an alternative simplified illustration of a routing table for part of an optical grooming interconnection network, according to an embodiment of the current disclosure.

Refer now to the example embodiments of FIGS. 5, 6, and 8. Transceiver 500 is initialized (step 600). Routing table 851 is created (step 610), which is illustrated graphically as routing table 851 on switches 821-832 and modems 850 and 860 on transceiver 800. In this routing table each switch of switches 821-832, except switch 827, is routed to either modem 850 or modem 865. In this embodiment, for simplicity of illustration each switch is routed to a modem graphically close to it, but in other embodiments other arrangements of routing between switches and modems may be chosen. In the embodiment of FIG. 8, switch 827 routes client data from client 808 across modem 850 and 860. Modem 850 has multiplexor 852, Modem 855 has multiplexor 857. Modem 860 has multiplexor 862. Modem 865 has multiplexor 867.

Data is received at a client, such as client 801 (Step 610). Client, such as client 801 sends the data to a switch, such as switch 821 (step 615). The data is routed to a modem, such as modem 850 through the optical grooming network (step 620).

In certain embodiments, data of a client may be divided across two or more modems. Referring back to FIGS. 5, 6, and 8, data arrives at client 801. Data from client is split (step 630). Data is set to switch (step 635). Each portion of the split data is routed to a different modem, modems 850 and 860, respectively (640). Data is transmitted across an optical link to a transceiver (step 642). Data is received at the other transceiver (step 645). Each portion of the split data is received by two modems, modems, respectively is routed to client (step 650). Each portion of the split data is deskewed (step 655) and combined at client.

What is claimed is:

1. A system comprising:
   an optical transceiver comprising:
   a set of electrical switches;
   wherein the set of electrical switches form an optical grooming interconnection system within the optical transceiver, such that each switch is communicatively coupled to each other switch in the set of electrical switches;
   a set of coherent optical modems;
   a set of clients;
   where each switch of the set of electrical switches is communicatively coupled to a client of the set of clients;
   wherein each client of the set of clients is enabled to communicate through the set of electrical switches to any coherent optical modem of the set of optical modems;
   wherein each coherent optical modem of the set of coherent optical modems is communicatively coupled to a switch of the set of electrical switches; and each coherent optical modem in the set of coherent optical modems can communicate to every other coherent optical modem of the set of coherent optical modems.

2. The system of claim 1 wherein each switch of the set of electrical switches is able to route information sent to a switch to another switch of the set of electrical switches based on metadata in the information.

3. The system of claim 2 wherein each coherent optical modem of the set of coherent optical modems contains a multiplexor enabled to combine data streams from multiple clients.

4. The system of claim 3 wherein the multiplexor of each coherent optical modem is enabled to combine data streams with bit rates of two clients into a single data stream with a single bit rate.

5. The system of claim 1 wherein each coherent optical modem of the set of coherent optical modems is selected from the group consisting of a coherent optical receive modem and a coherent optical transmit modem.

6. An optical transceiver comprising:
   a set of electrical switches;
   wherein the set of electrical switches form an optical grooming interconnection system within the optical transceiver such that each switch is communicatively coupled to each other switch in the set of electrical switches;
   a set of coherent optical modems;
   a set of clients;
   where each switch of the set of electrical switches is communicatively coupled to a client of the set of clients;
   wherein each client of the set of clients is enabled to communicate through the set of electrical switches to each coherent optical modem of the set of coherent optical modems;
   wherein each coherent optical modem is communicatively coupled to a switch of the set of electrical switches; and
   each coherent optical modem in the set of coherent optical modems can communicate to every other coherent optical modem of the set of coherent optical modems.

7. The optical transceiver of claim 6 wherein each switch of the set of electrical switches is able to route information sent to the switch to another switch of the set of electrical switches based on metadata in the information.

8. The optical transceiver of claim 7 wherein each coherent optical modem of the set of coherent optical modems contains a multiplexor enabled to combine data streams from multiple clients.

9. The optical transceiver of claim 8 wherein the multiplexor of each coherent optical modem is enabled to combine data streams with bit rates of two clients into a single data stream with a single bit rate.

10. The optical transceiver of claim 6 wherein each coherent optical modem of the set of coherent optical modems is selected from the group consisting of a coherent optical receive modem and a coherent optical transmit modem.

11. A method for routing information in an optical transceiver using an optical grooming network within the optical transceiver comprising:
   initializing a set of electrical switches within the optical transceiver by creating a routing table for the set of electrical switches;
   wherein the routing table enables each switch of the set of electrical switches to communicate with each other switch in the set of electrical switches;
   where each switch of the set of electrical switches is communicatively coupled to a client of a set of clients in the optical transceiver;
   wherein the routing table enables each client of the optical transceiver to communicate through the set of electrical switches to each optical coherent modem of a set of optical coherent modems within the optical transceiver;
   wherein the routing table maps each coherent optical modem to a switch of the set of electrical switches; and
   the routing table maps each coherent optical modem in the set of coherent optical modems to every other coherent optical modem of the set of coherent optical modems.

12. The method of claim 11 wherein each switch of the set of electrical switches is able to route information sent to the switch to another switch of the set of electrical switches based on metadata in the information.

13. The method of claim 12 wherein each coherent optical modem of the set of coherent optical modems contains a multiplexor enabled to combine data streams from multiple clients.

14. The method of claim 13 wherein the multiplexor of each coherent optical modem is enabled to combine data streams with bit rates of two clients into a single data stream with a single bit rate.

15. The method of claim 11 wherein each coherent optical modem of the set of coherent optical modems is selected from the group consisting of a coherent optical receive modem and a coherent optical transmit modem.

\* \* \* \* \*